(12) United States Patent
Kim et al.

(10) Patent No.: US 9,391,999 B2
(45) Date of Patent: Jul. 12, 2016

(54) METHOD AND SYSTEM FOR EXECUTING APPLICATIONS IN A MOBILE DEVICE

(75) Inventors: Young Seol Kim, Seoul (KR); Jae Won Lee, Gyeonggi-do (KR); Sung Gun Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/045,101

(22) Filed: Mar. 10, 2011

(65) Prior Publication Data

US 2011/0230211 A1    Sep. 22, 2011

(30) Foreign Application Priority Data

Mar. 17, 2010  (KR) .................. 10-2010-0023785

(51) Int. Cl.
| | |
|---|---|
| H04W 24/00 | (2009.01) |
| H04L 29/06 | (2006.01) |
| G06F 21/71 | (2013.01) |
| H04W 4/00 | (2009.01) |
| H04W 4/02 | (2009.01) |
| H04W 12/08 | (2009.01) |
| H04W 48/08 | (2009.01) |
| H04W 48/04 | (2009.01) |
| H04W 84/18 | (2009.01) |

(52) U.S. Cl.
CPC ............. *H04L 63/107* (2013.01); *G06F 21/71* (2013.01); *H04L 63/102* (2013.01); *H04W 4/001* (2013.01); *H04W 4/003* (2013.01); *H04W 4/021* (2013.01); *H04W 12/08* (2013.01); *H04W 48/08* (2013.01); *G06F 2221/2111* (2013.01); *H04W 48/04* (2013.01); *H04W 84/18* (2013.01)

(58) Field of Classification Search
USPC .......................................... 455/456.1–456.5
See application file for complete search history.

(56) References Cited

U.S. PATENT DOCUMENTS

| | | | |
|---|---|---|---|
| 7,933,611 B2 * | 4/2011 | Bocking et al. ............ 455/456.4 |
| 2004/0155969 A1 | 8/2004 | Hayashi | |
| 2005/0055574 A1 | 3/2005 | Chmaytelli | |
| 2006/0059099 A1 | 3/2006 | Ronning et al. | |
| 2007/0019601 A1 | 1/2007 | Kim et al. | |

(Continued)

FOREIGN PATENT DOCUMENTS

| | | |
|---|---|---|
| CN | 1867918 | 11/2006 |
| CN | 100507907 | 7/2009 |
| EP | 1 895 750 | 3/2008 |

(Continued)

OTHER PUBLICATIONS

Disclosed Anonymously: "Patch Signing and Profile based application White-listing", Research Disclosure, Mason Publications, Aug. 1, 2007.

(Continued)

*Primary Examiner* — Joel Ajayi
(74) *Attorney, Agent, or Firm* — The Farrell Law Firm, P.C.

(57) ABSTRACT

A method and system for executing applications in a mobile device including receiving a request for execution of the application; determining whether the mobile device is located in a restricted area where execution of the application is controlled; and determining, when the mobile device is located in a restricted area, whether to execute the application requested for execution, according to a application execution policy that allows for execution of the application in the restricted area.

10 Claims, 6 Drawing Sheets

(56) References Cited

U.S. PATENT DOCUMENTS

2009/0322890 A1    12/2009  Bocking et al.
2011/0087878 A1*   4/2011   Weis et al. .................... 713/151

FOREIGN PATENT DOCUMENTS

| JP | 2004-260796 | 9/2004 |
|---|---|---|
| KR | 1020050050420 | 5/2005 |
| KR | 1020070004390 | 1/2007 |
| WO | WO 2005/026878 | 3/2005 |

OTHER PUBLICATIONS

Chinese Office Action dated Jul. 20, 2015 issued in counterpart application No. 201110053598.7.
European Search Report dated Jul. 9, 2015 issued in counterpart application No. 11151317.2-1870.
Korean Office Action dated Mar. 23, 2016 issued in counterpart application No. 10-2010-0023785, 4 pages.

* cited by examiner

METHOD AND SYSTEM FOR EXECUTING APPLICATIONS IN A MOBILE DEVICE

PRIORITY

This application claims priority under 35 U.S.C. §119(a) to Korean Patent Application No. 10-2010-0023785, which was filed in the Korean Intellectual Property Office on Mar. 17, 2010, the disclosure of which is incorporated herein in its entirety by reference.

BACKGROUND OF THE INVENTION

1. Field of the Invention

The present invention relates generally to communication systems, and more particularly, to a method, mobile device, and system that restrictedly execute applications in a mobile device, based on information about an area where the mobile device is located.

2. Description of the Related Art

Conventional area-based control systems restrict mobile device functionality such as camera functionality or Bluetooth® communication, by controlling execution of applications corresponding to the functions, when the mobile device user enters a particular geographical area. For example, when a user enters a particular area, carrying a mobile device, and then executes an application for a camera installed in the mobile device, the conventional area-based control system controls the application execution of the mobile device platform not to execute the camera application if the camera application is contained in a list of applications that may not be executed. That is, in conventional art, restrictions related to executing applications or services are controlled by a listing.

In general, most applications installed to conventional mobile devices are provided by mobile device manufacturers or communication service providers. In conventional area-based application control systems, security causes a problem by listing applications or services that are not allowed to be executed and by restricting execution of them when a user carrying a mobile device enters a particular area.

In recent years, with the extension of the area to which echo-systems (i.e., systems capable of performing transactions corresponding to mobile applications, such as Google Inc.'s Android Market and Apple Inc.'s App Store, for example) are applied, the applications that can be executed in mobile devices have increased in terms of the number and the types. In particular, the number of applications developed by third-party developers has increased by a greater rate than that of default applications provided by manufacturers or communication service providers. In this environment, it is difficult to predict which applications are installed to mobile devices and also what types of applications will be developed.

Since applications developed by third-part developers can be executed without following a strict verification procedure, they may have drawbacks in terms of security. When an application is operated and executed without a strict verification procedure, it may violate the security policy of a particular organization or geographical area.

Recently, with the increase in popularity of smart phones, the importance of security has also increased. In particular, it is impossible to predict which applications users execute in smart phones that use open platforms. This is because it is impossible to predict what applications will be developed, distributed, and executed, based on an open platform provided by mobile device manufacturers.

If such various types of applications are executed in a normal situation there are no problems. However, problems may arise in particular high security organizations and companies, government originations and the military.

Therefore, execution of a particular application in a mobile device must be controlled in an environment where it is impossible to predict which applications can be executed.

SUMMARY OF THE INVENTION

The present invention has been made in view of at least the above problems, and provides a method and system for controlling execution of a particular application in a mobile device.

The present invention further provides a method for executing previously designated applications only in a particular area.

In accordance with an embodiment of the invention, a method for executing an application in a mobile device includes receiving a request for execution of the application; determining whether the mobile device is located in a restricted area where execution of the application is controlled; and determining, when the mobile device is located in a restricted area, whether to execute the application requested for execution, according to an application execution policy that allows for execution of the application in the restricted area.

In accordance with another embodiment of the invention, a method for executing an application for a mobile device includes setting an application executing restriction when the mobile device enters a restricted area where execution of the application is controlled; determining, when receiving a request for execution of the application, whether the mobile device is located in the restricted area; and determining, when the mobile device is located in a restricted area, whether to execute the application requested for execution, according to an application execution policy that allows for execution of the application in the restricted area.

In accordance with another embodiment of the invention, a mobile device includes a Radio Frequency (RF) communication unit for receiving an application execution policy that allows for execution of applications in a restricted area where execution of application is controlled; a storage unit for storing the application execution policy that is received; an input unit for receiving an application executing request; and a controller. The controller determines whether the mobile device is located in the restricted area, according to the received application executing request. The controller determines whether to execute the application requested for execution, according to the application execution policy.

BRIEF DESCRIPTION OF THE DRAWINGS

The above and other features and advantages of the present invention will become more apparent from the following detailed description in conjunction with the accompanying drawings, in which.

DETAILED DESCRIPTION OF EMBODIMENTS OF THE PRESENT INVENTION

Hereinafter, embodiments of the invention are described in detail with reference to the accompanying drawings. The same reference numbers are used throughout the drawings to refer to the same or similar parts. In addition, detailed descriptions of well-known functions and structures incorporated herein may be omitted to avoid obscuring the subject matter of the invention.

Prior to explaining the embodiments of the invention, terminologies will be explained for the present description below. One skilled in the art will understand that the embodiments disclosed in the description and configurations illustrated in the drawings are only preferred embodiments and various modifications, alterations, and equivalents can be made without departing from the spirit and scope of the invention.

The term 'application' refers to programs, services, and the like that can be executed in a mobile device. Examples of applications are a camera operating application, a Bluetooth® operating application, a game application, a voice or video call service, or the like. It will be noted that the types of applications of the invention are not limited to the examples listed above. For example, the application may further include all types of programs, services, and the like that mobile device manufacturers or third-party developers develop and provide.

The term 'restricted area' refers to a particular area where only previously designated applications can be executed such as a particular worksite of a company or a military organization.

Figure 1:
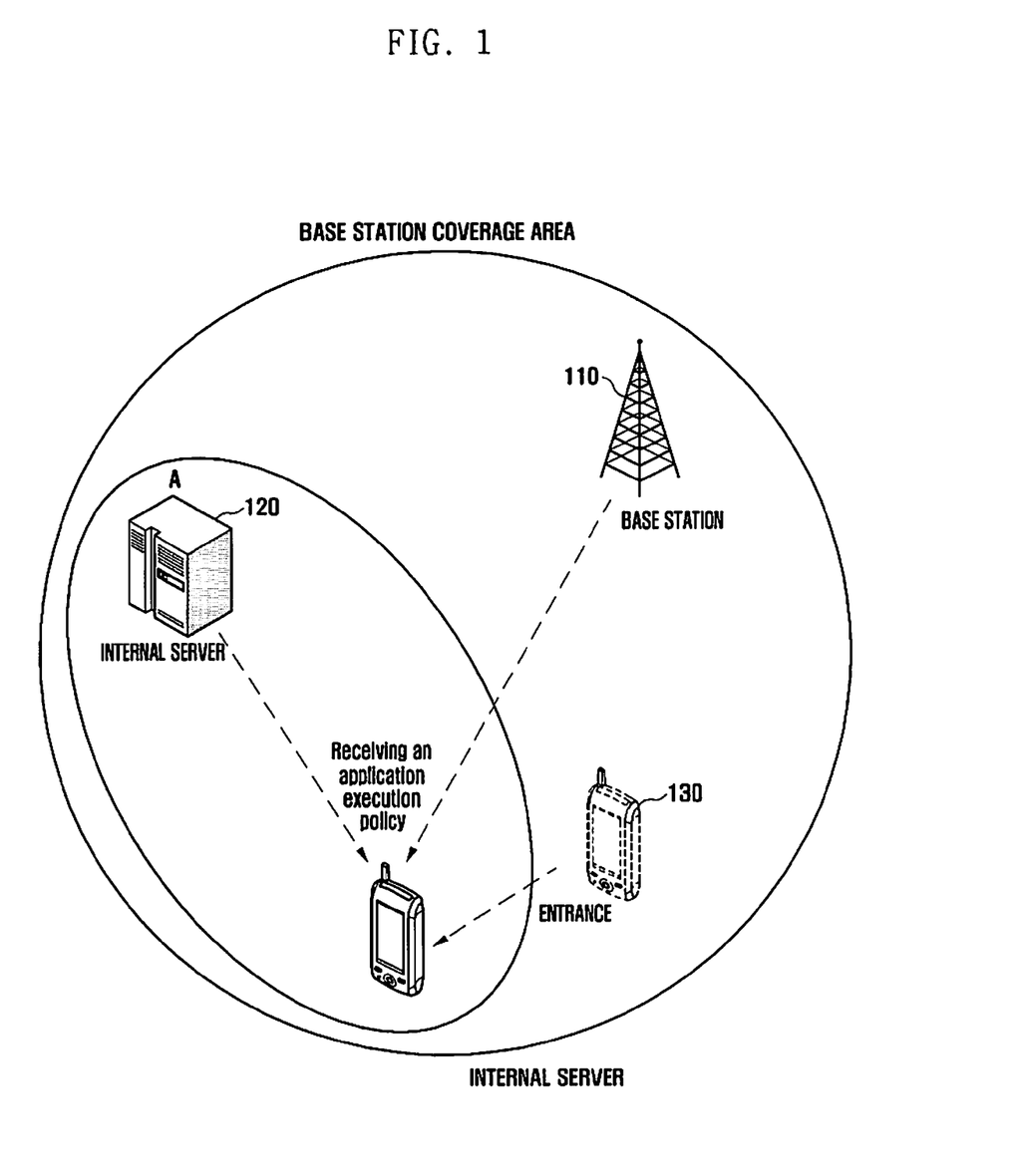
FIG. 1 is a diagram that illustrates a system for controlling execution of an application in a mobile device 130, based on an application execution policy that the mobile device 130 receives from a base station 110 or a server 120, according to an embodiment of the invention.

FIG. 1 is a diagram that illustrates a system for controlling execution of an application in a mobile device 130, based on an application execution policy that the mobile device 130 receives from a base station 110 or a server 120, according to an embodiment of the invention.

Referring to FIG. 1, the system includes a base station 110, a sever 120 and a mobile device 130.

The base station 110 provides communication services to mobile devices in the base station coverage (or a cell) area. The base station 110 is linked to the mobile device 130 via a wireless channel and controls wireless sources. The base station 110 creates control information for a cell, as system information, and broadcasts it. The base station 110 also allocates wireless sources in order to transmit or receive data or control information to or from the mobile device 130. The base station 110 collects information about the channel measurement result between a current cell and adjacent cells to determine whether to perform a handover and instructs a handover to be performed, if necessary.

In an embodiment of the invention, the base station 110 stores an application execution policy for a restricted area in its communication radius. The application execution policy may be acquired from a security administrator of a particular company, a military commander, or the like. The base station 110 monitors whether the mobile device 130 enters a restricted area. When the mobile device 130 enters a restricted area, the base station 110 may transmit the application execution policy to the mobile device 130.

The sever 120 refers to a computer that provides a particular service to clients via a network. The server 120 may be located inside or outside a restricted area. The server 120 monitors whether the mobile device 130 enters a restricted area. When the mobile device 130 enters a restricted area, the server 120 may transmit the application execution policy to the mobile device 130.

The mobile device 130 is linked to the base station 110 via a wireless channel. The mobile device 130 can use services, such as a voice or video call, Short Message Service (SMS), and the like, via the base station 110.

When the mobile device 130 enters a restricted area where execution of a particular application is restricted, it receives and stores an application execution policy from the base station 110 or the server 120 managing the restricted area. While the mobile device 130 remains in the restricted area, it can periodically update, remove, or modify the application execution policy, by periodically communicating with the base station 110 or the server 120.

When a particular application execution event occurs, the mobile device 130 determines whether the application requested for execution is contained in the application execution policy. The mobile device 130 executes the application only if it is contained in the application execution policy.

As described above, when particular applications that can be executed in a particular area are previously designated, the security in the area can be protected against execution of various applications of unpredictable types.

A method for controlling execution of an application in the mobile device will now be provided, referring to the accompanying drawings.

Figure 2:
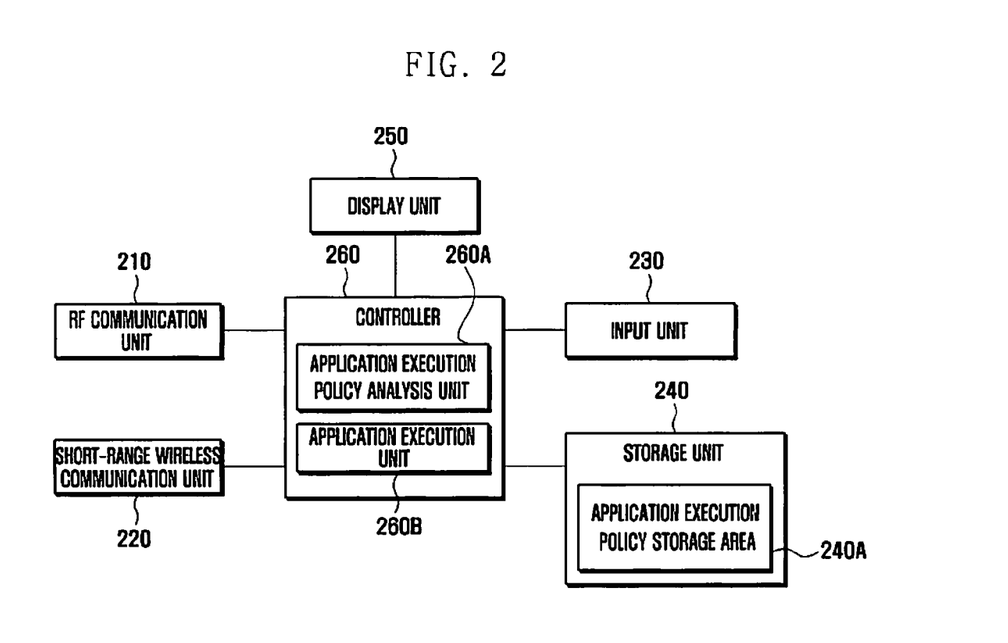
FIG. 2 is a diagram that illustrates an internal configuration of a mobile device 130 according to an embodiment of the invention.

FIG. 2 illustrates an internal configuration of a mobile device 130 according to an embodiment of the invention.

Referring to FIG. 2, the mobile device 130 includes an RF communication unit 210, a short-range wireless communication unit 220, an input unit 230, a storage unit 240, a display unit 250, and a controller 260.

The RF communication unit 210 performs wireless communication with other communication systems. The RF communication unit 210 includes an RF transmitter for up-converting the frequency of signals to be transmitted and amplifying the signals and an RF receiver for low-noise amplifying received RF signals and down-converting the frequency of the received RF signals. The RF communication unit 210 receives data via a wireless channel and outputs it to the controller 260. The RF communication unit 210 receives data from the controller 260 and transmits it via a wireless channel. In an embodiment of the invention, the RF communication unit 210 receives an application execution policy from the base station 110 or the server 120.

The application execution policy processed as a data packet is transmitted from the base station 110 to the mobile device 130. An example of the structure of the data packet is shown in FIG. 3.

Figure 3:
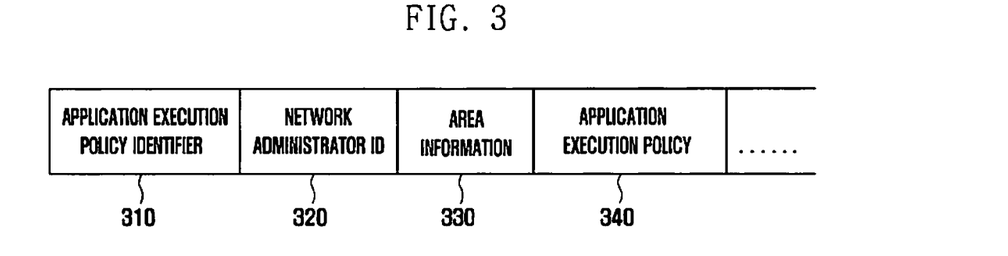
FIG. 3 is a diagram that illustrates a structure of a data packet containing an application execution policy, according to an embodiment of the invention.

FIG. 3 illustrates a structure of a data packet containing an application execution policy, according to an embodiment of the invention.

As shown in FIG. 3, the data packet includes a number of fields, for example, an application execution policy identifier field 310, a network administrator ID field 320, an area information field 330, an application execution policy field 340, and the like.

The application execution policy identifier field 310 represents a corresponding data packet that contains an application execution policy.

The network administrator ID field 320 refers to an identifier regarding an administrator who takes charge of security in a restricted area, for example, a particular company ID, a military ID, or the like.

The area information field 330 contains information identifying a restricted area. For example, the same company may have a number of workplaces (i.e., restricted areas) in different locations. In this case, it is necessary to define which one of the business places an application execution policy corresponds to. The area information field 330 is used to identify a restricted area.

The application execution policy 340 contains information about applications that can be executed in a particular restricted area. The structure of the application execution policy is illustrated in detail in FIG. 4.

Figure 4:
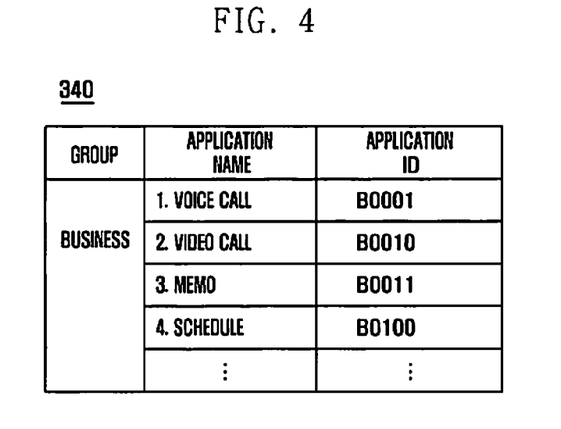
FIG. 4 is a diagram that illustrates a structure of an application execution policy, according to an embodiment of the invention.

FIG. 4 illustrates a structure of an application execution policy, according to an embodiment of the invention.

Referring to FIG. 4, each application executable in the mobile device 130 has an application name and application identifier (ID). The application execution policy is managed by grouping applications executable in a restricted area. For example, as shown in FIG. 4, a business place of a particular company allows for execution of applications only in the business group. The business group contains applications, for example, a voice call, a video call, a memo, a schedule, and the like. On the contrary, the restricted area does not allow for execution of applications in a game group and an entertainment group (not shown). One of the base station 110 or the server 120 may transmit an application execution policy for a single group or a number of groups to the mobile device 130.

Referring back to FIG. 2, the short-range wireless communication unit 220 performs short-range wireless communication with other short-range wireless communication devices. The short-range wireless communication unit 220 includes a short-range wireless communication transmitter and a short-range wireless communication receiver. In an embodiment of the invention, short-range wireless communication may include all types of communications, for example, Bluetooth®, Zigbee®, Ultra Wide Band (UWB), and the like. The short-range wireless communication unit 220 may receive an application execution policy from the server 120 having a short-range wireless communication function.

The input unit 230 receives user key signals for operating the mobile device 130 and outputs them to the controller 260. The input unit 230 may be implemented with a keypad that includes numerical keys, direction keys, and the like. The input unit 230 may also be implemented with a function key installed to one side of the mobile device 130. When the display unit 250 is implemented with a touch screen, the touch screen also serves as the input unit 230. In an embodiment of the invention, the input unit 230 receives user input for executing an application, creates a request signal for executing the application, and transfers it to the controller 260.

The storage unit 240 stores programs required to operate the entire function of the mobile device 130 and data generated when the programs are executed. To this end, the storage unit 240 is comprised of a program storage area and a data storage area. The program storage area stores an Operating System (OS) for booting the mobile device, a program for configuring an idle screen, and application programs for executing option functions, for example, a camera function, an audio playback, an image or moving image playback, and the like. When the user requests the respective listed functions in the mobile device, the controller activates corresponding application programs and provides corresponding functions to the user.

In an embodiment of the invention, the storage unit 240 includes an application execution policy storage area 240A. When the mobile device 130 enters a restricted area, the application execution policy storage area 240A stores an application execution policy from the base station 110 or the server 120. The application execution policy storage area 240A may periodically update the application execution policy.

The display unit 250 may be implemented with a Liquid Crystal Display (LCD), an Organic Light Emitting Diode (OLED), or the like. The display unit 250 may also be implemented with a touch screen comprised of a touch panel or touch film. The display unit 250 displays menus of the mobile device 130, received data, function setting information and addition information. For example, the display unit 250 displays a booting screen, an idle screen, a display screen, a call screen, an option setting screen, application executing screen, and the like. The display unit 250 may also display a screen executing a requested application or a screen declining execution of a requested application. In particular, when a refusal is made to execute a requested application in a restricted area, the display unit 250 displays a security warning message stating that the policy has been violated.

The controller 260 controls the entire operation of the mobile device 130. The controller 260 detects whether the mobile device 130 enters a restricted area. The controller 260 receives an application execution policy and stores it. The controller 260 controls execution of a particular application according to the application execution policy. The controller 260 periodically updates, deletes, or modifies the application execution policy. In an embodiment of the invention, the controller 260 includes an application execution policy analysis unit 260A and an application execution unit 260B.

The application execution policy analysis unit 260A senses a request signal for executing an application via the input unit 230 and determines whether the mobile device 130 is located in a restricted area where permission is required to execute the application. The application execution policy analysis unit 260A determines whether to execute the application requested for execution, using the application execution policy stored in the application execution policy storage area 240A. When the application execution policy contains the ID of the application requested for execution, the application execution policy analysis unit 260A creates a signal for permitting execution of the application. On the contrary, when the application execution policy does not contain the ID of the application, the application execution policy analysis unit 260A creates a signal for refusing execution of the application.

The application execution unit 260B receives execution permission or refusal signal from the application execution policy analysis unit 260A. The application execution unit 260B executes the application requested for execution or declines execution of the application according to the received signal.

Although the embodiment is implemented in such a way that the controller 260 includes the application execution policy analysis unit 260A and the application execution unit 260B, which are separated and perform their functions respectively, it can be modified so that the controller 260 can perform their functions.

Figure 5:
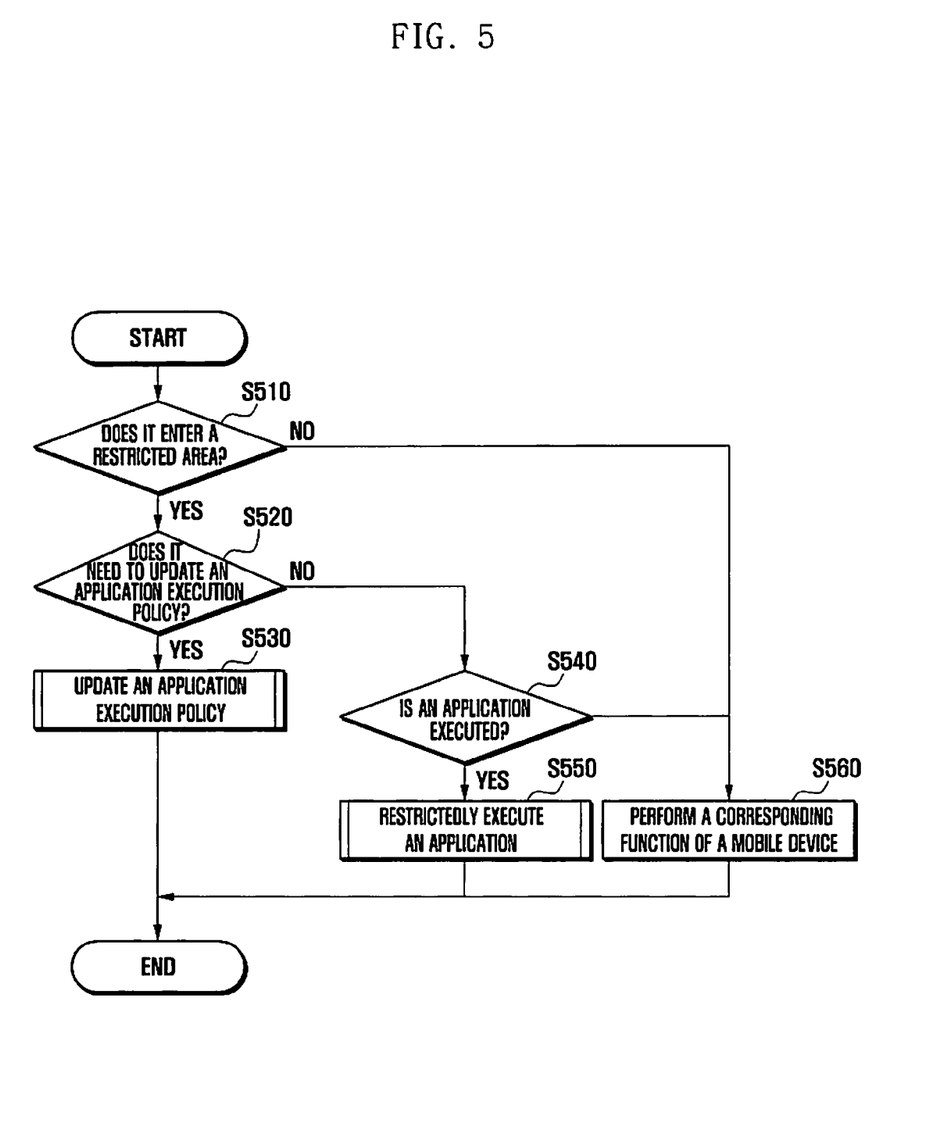
FIG. 5 is a diagram that illustrates a flow chart that describes a method for receiving an application execution policy and executing a particular application in a mobile device when the mobile device enters a restricted area, according to an embodiment of the invention.

FIG. 5 illustrates a flow chart that describes a method for receiving an application execution policy and executing a particular application in a mobile device when the mobile device enters a restricted area, according to an embodiment of the invention.

The controller 260 determines whether the mobile device 130 enters a restricted area in step S510. When the mobile device 130 is linked to the base station 110, it periodically transmits and receives a signal to and from the base station 110. The controller 260 can determine whether the mobile device 130 enters a restricted area through a periodical signal transmission process between the mobile device 130 and the base station 110. Alternatively, when the mobile device 130 passes through a particular location in a restricted area, to which a sensor is installed, the controller 260 can ascertain that the mobile device 130 entered the restricted area. When the controller 260 ascertains that the mobile device 130 does not enter a restricted area at step S510, it does not control execution of an application and performs a corresponding function of the mobile device 130 in step S560.

On the contrary, when the controller 260 ascertains that the mobile device 130 enters a restricted area in step S510, it determines whether to update an application execution policy in step S520. The updating process includes first receiving an application execution policy, and adding, deleting, or modifying the received application execution policy, and the like. When the controller 260 determines to update an application execution policy in step S520, it updates the application execution policy in step S530.

On the contrary, when the controller 260 determines not to update an application execution policy at step S520, it determines whether to execute an application in step S540. When the controller 260 determines to execute an application in step S540, it restrictedly executes the application in step S550. On the contrary, when the controller 260 determines not to execute an application in step S540, it performs a corresponding function of the mobile device 130 in step S560.

Figure 6:
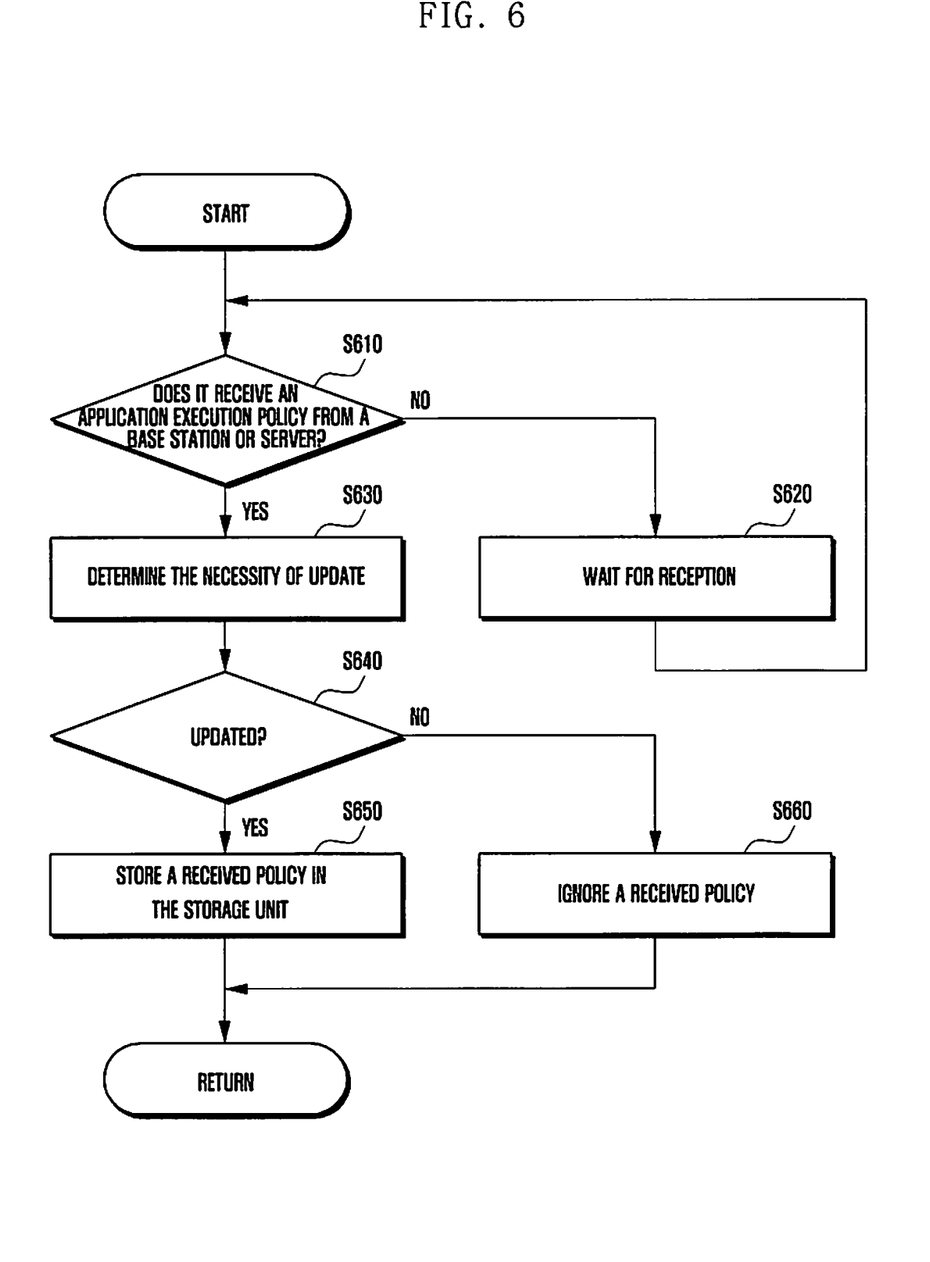
FIG. 6 is a diagram that illustrates a detailed flow chart that describes a process for updating an application execution policy at step S530 of FIG. 5.

FIG. 6 illustrates a detailed flow chart that describes a process for updating an application execution policy in step S530 of FIG. 5.

The controller 260 determines whether the mobile device 130 receives an application execution policy from the base station 110 or the server 120 in step S610. When the controller 260 ascertains that the mobile device 130 has not received an application execution policy at step S610, it waits for an application execution policy in step S620.

On the contrary, when the controller 260 ascertains that the mobile device 130 receives an application execution policy in step S610, it determines whether to update the application execution policy in step S630. For example, when the mobile device 130 enters a particular restricted area for the first time, it needs to update the application execution policy regarding the restricted area. In addition, although the mobile device 130 has already stored an application execution policy regarding the restricted area, it needs to alter or modify the application execution policy if a certain period of time has elapsed. In this case, the controller 260 of the mobile device 130 updates the application execution policy.

Figure 7:
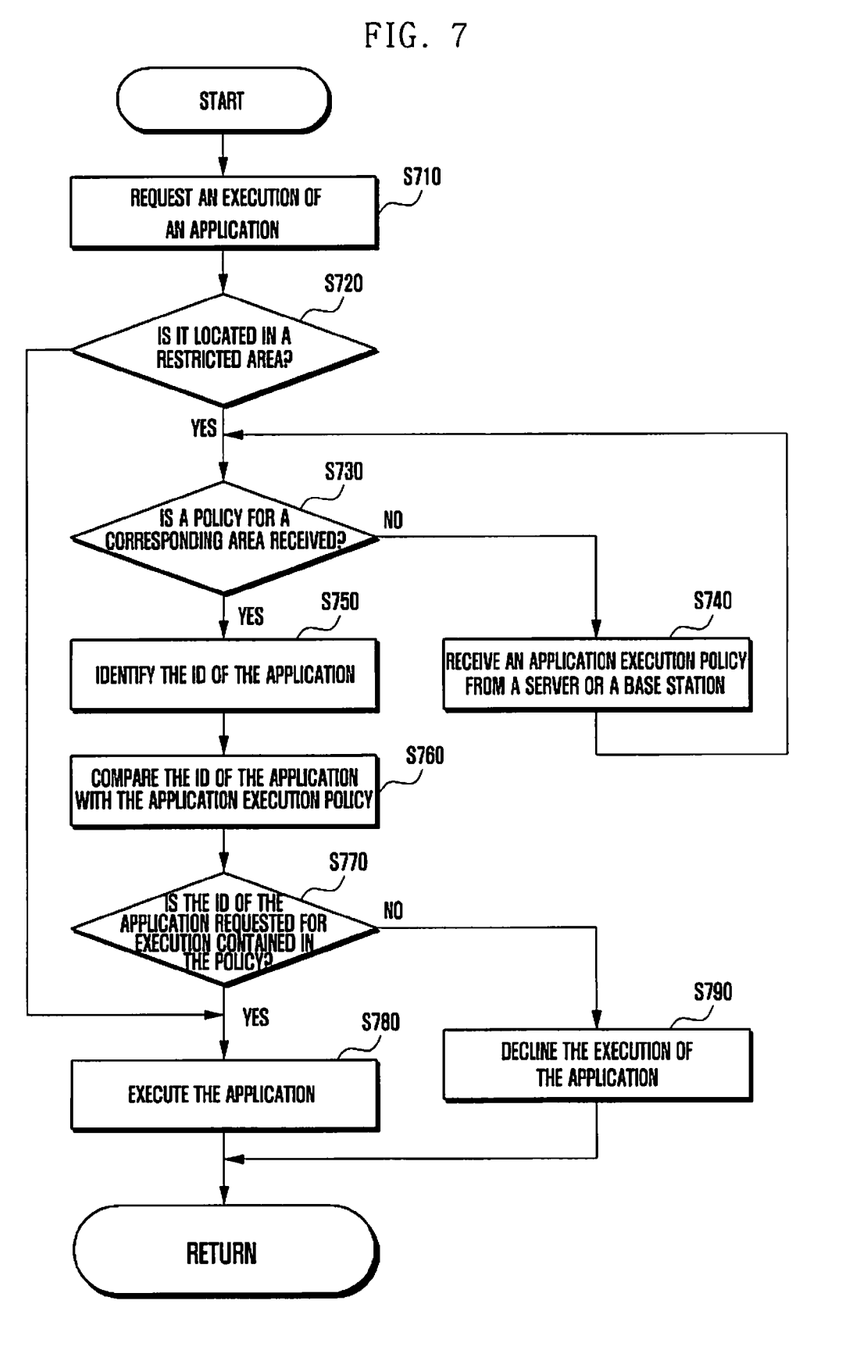
FIG. 7 is a diagram that illustrates a detailed flow chart that describes a process for controlling execution of an application at step S550 of FIG. 5.

When the controller 260 determines to update the application execution policy in S640, it stores the received application execution policy in the application execution policy storage area 240A of the storage unit 240 in step S650. On the contrary, when the controller 260 determines not to update the application execution policy in S640, it ignores the received application execution policy in step S660. FIG. 7 illustrates a detailed flow chart that describes a process for controlling execution of an application in step S550 of FIG. 5.

The controller 260 senses a request for executing an application input to the mobile device 130 in step S710. After that, the controller 260 determines whether the mobile device 130 is located in a restricted area where execution of an application is controlled in step S720. Although the process of step 720 is the same as step S510 of FIG. 5 and is repeated after step S510, it needs to be performed because the mobile device 130 may move out of the restricted area for a time difference after a period of time.

When the controller 260 ascertains that the mobile device 130 is not located in a restricted area at step S720, it executes a requested application in step S780. On the contrary, when the controller 260 ascertains that the mobile device 130 is located in a restricted area at step S720, it determines whether the mobile device 130 receives an application execution policy regarding the restricted area in step S730. When the controller 260 ascertains that the mobile device 130 does not receive an application execution policy at step S730, it receives an application execution policy from the base station 110 or the server 120 managing a corresponding restricted area in step S740.

On the contrary, when the controller 260 ascertains that the mobile device 130 receives an application execution policy in step S730, it identifies the ID of an application requested for execution in step S750. After that, the controller 260 compares the identified application ID with the application execution policy regarding the restricted area in step S760. The controller 260 determines whether the ID of the application requested for execution is contained in the application execution policy in step S770. When the controller 260 ascertains that the ID of the application requested for execution is contained in the application execution policy in step S770, it executes the application in step S780.

On the contrary, when the controller 260 ascertains that the ID of the application requested for execution is not contained in the application execution policy in step S770, it declines execution of the application in step S790. In an embodiment of the invention, the controller 260 can display a security warning message or an execution declining message on the display unit 250 when it declines execution of the application, which is described in detail, as follows, referring to FIGS. 8 to 10.

Figure 8:
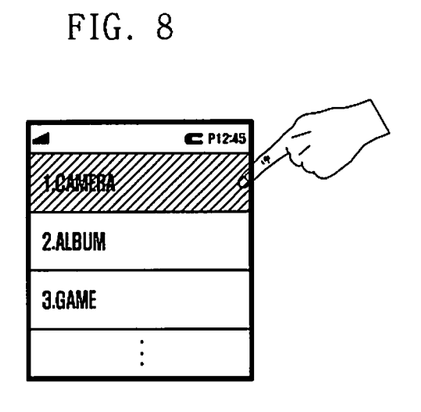
FIG. 8 to FIG. 10 are diagrams that illustrate screens of a display unit 250 that describes a case when an execution of a particular application is declined, according to an embodiment of the invention.
Figure 9:
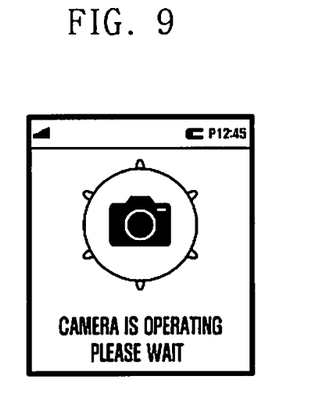
Figure 10:
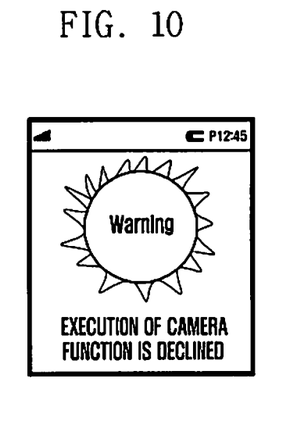

FIG. 8 to FIG. 10 illustrate screens of a display unit 250 that describes a case when an execution of a particular application is declined, according to an embodiment of the invention.

As shown in FIG. 8, it is assumed that a request is made to operate a camera function in the mobile device 130. When the mobile device 130 is not located in a restricted area, it can normally operate the camera, showing a message stating 'Camera is operating' on the display unit 250 as shown in FIG. 9.

On the contrary, when the mobile device 130 is located in a restricted area, it cannot execute the camera function, showing a warning message 'Execution of camera function is declined' on the display unit 250 as shown in FIG. 10.

Although the embodiment as shown in FIG. 7 is implemented in such a way that, when a request is made to execute an application, a determination is made whether the mobile device 130 is located in a restricted area and then the application is executed according to the application execution policy regarding the restricted area, it is understood that the order of the processes may be altered. That is, an application executing restriction is set when the mobile device 130 enters a restricted area, and then, an application is executed, according to an application execution policy regarding the restricted area, when a request is made to execute the application.

As described above, the method and system of the invention can effectively control execution of particular applications in an environment where various types of applications may be executed in the mobile device 130.

As described above, the method and system of the invention secure the security of a system in a particular area by designating applications that can be executed in the area, compared with conventional art that designates applications that cannot be executed in the area. The method and system of the invention can prevent the wastage of resources by controlling the use of applications and services in a particular area.

Although embodiments of the invention have been described in detail hereinabove, it should be understood that many variations and modifications of the basic inventive concept herein described, which may be apparent to those skilled in the art, will still fall within the spirit and scope of the embodiments of the invention as defined in the appended claims.

What is claimed is:

1. A method for executing an application in a mobile device, comprising:
   receiving a request for execution of the application;
   determining whether the mobile device is located in a restricted area where execution of the application is controlled; and
   determining, when the mobile device is located in the restricted area, whether to execute the application requested for execution, according to an application execution policy that allows for execution of the application in the restricted area,
   wherein determining whether the mobile device is located in the restricted area further comprises periodically transmitting a signal to a base station, and receiving a data packet including the application execution policy,
   wherein, the application execution policy includes applications executable in the restricted area, which are grouped based on a type of each of the applications,
   wherein the data packet including the application execution policy includes an application execution policy identifier field, a network administrator ID field, an area information field, and an application execution policy field, and
   wherein the application execution policy field is determined based on the area information field.

2. The method of claim 1, wherein determining whether the mobile device is located in a restricted area further comprises:
   receiving the application execution policy regarding the restricted area.

3. The method of claim 2, wherein receiving the application execution policy is receiving the data packet including the application execution policy.

4. The method of claim 1, further comprising:
   periodically updating the application execution policy regarding the restricted area.

5. The method of claim 2, wherein receiving the application execution policy is receiving the application execution policy from a base station or a server managing the restricted area.

6. The method of claim 1, further comprising:
   setting an application executing restriction when the mobile device enters the restricted area where execution of the application is controlled.

7. A mobile device comprising:
   a Radio Frequency (RF) communication unit for receiving an application execution policy that allows for execution of applications in a restricted area where execution of application is controlled;
   a storage unit for storing the application execution policy that is received;
   an input unit for receiving an application executing request; and
   a controller configured to determine whether the mobile device is located in the restricted area, according to the received application executing request, and determining, when the mobile device is located in the restricted area, whether to execute the application requested for execution,
   wherein the controller is further configured to transmit a signal to a base station periodically, and receiving a data packet including the application execution policy,
   wherein, the application execution policy includes applications executable in the restricted area, which are grouped based on a type of each of the applications,
   wherein the data packet including the application execution policy includes an application execution policy identifier field, a network administrator ID field, and area information field, and an application execution policy field, and
   wherein the application execution policy field is determined based on the area information field.

8. The mobile device of claim 7, wherein the RF communication unit receives the data packet including the application execution policy.

9. The mobile device of claim 7, wherein the controller periodically updates the application execution policy regarding the restricted area.

10. The mobile device of claim 7, wherein the RF communication unit receives the application execution policy from a base station or a server managing the restricted area.

\* \* \* \* \*